Sept. 17, 1929.  A. F. MASURY  1,728,873
FLEXIBLE CONNECTION FOR MOTOR VEHICLE PANELS
Filed Sept. 1, 1928
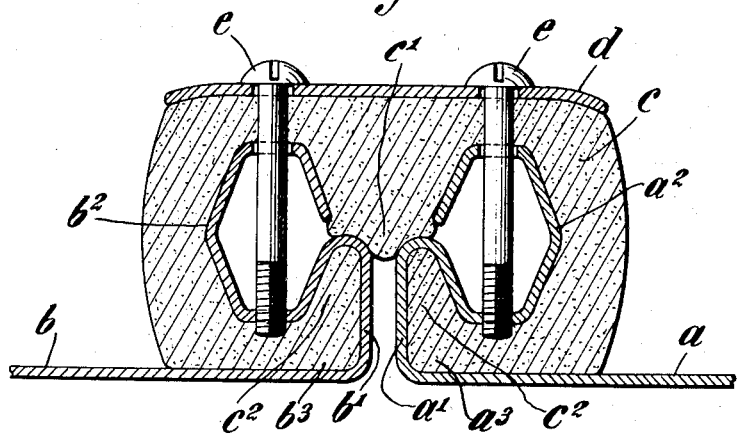
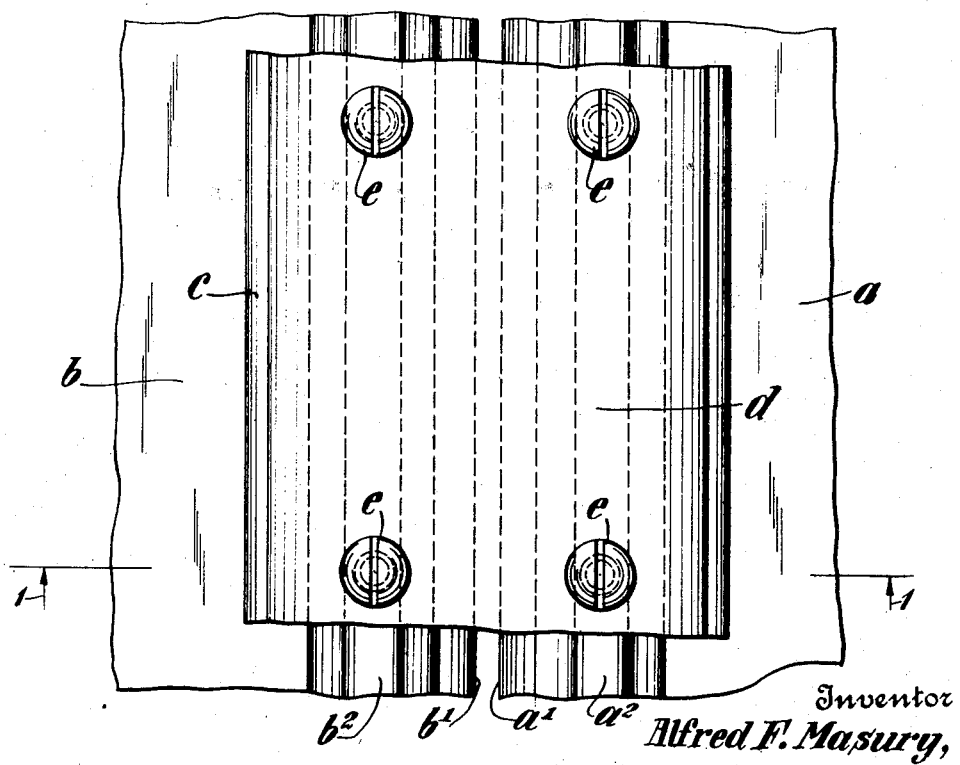
Inventor
Alfred F. Masury,
By his Attorneys
Redding, Greeley, O'Shea & Campbell Patented Sept. 17, 1929

1,728,873

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

FLEXIBLE CONNECTION FOR MOTOR-VEHICLE PANELS

Application filed September 1, 1928. Serial No. 303,464.

This invention relates to connections between adjacent panels forming the body of a motor vehicle, the panels being mounted to permit weaving of the body, thus accommodating a slight relative movement between such panels. Common practice heretofore has provided connections of panels of the above character which are hand fitted and, therefore, quite expensive. Such connections have not been designed to accommodate relative movement without considerable wear and the present invention relates to connections which not only secure the panels together effectively but also permit a degree of movement therebetween without injuring the connection in the slightest.

An object of the invention is to provide a connection of the above character which is strong and capable of permitting a degree of movement between the panels without occasioning any wear upon the parts whatsoever. It is further contemplated to form the connection in a manner such that it may be manufactured rapidly and cheaply by stamping operations which are now commonly used.

The invention is characterized, more specifically, by flanges formed on the adjacent edges of two panels, the flanges being formed with turned back extensions on their ends to form substantially closed polygons. Surrounding these extensions, and lying between opposed faces of the polygons, non-metallic yielding moulding is provided to secure the panels together as well as space them apart.

Further objects will appear as the description of the invention proceeds and reference will now be had to the accompanying drawings, wherein:

Figure 1 is a view in section, taken on line 1—1 of Figure 2 and looking in the direction of the arrows, showing one form of connection in accordance with the present invention.

Figure 2 is a plan view of the connection shown in Figure 1.

Referring to the above drawings, $a$ indicates a panel suitable for forming a portion of the vehicle body and provided with an angular extension $a'$. The extremity of this extension is formed as a closed polygonal section $a^2$, the portions of which adjacent to the extension $a^2$ and panel $a$ form reentrant angles which provide a groove $a^3$ therebetween. The adjacent panel $b$ is formed with a similar extension $b'$ and closed portion $b^2$ which forms a similar groove $b^3$. A non-metallic yielding molding $c$, of generally M shaped cross section, is provided with a thickened portion $c'$ and an inwardly extending toe portion $c^2$ which engages the grooves $a^3$ and $b^3$, respectively. The thickened portion $c'$ extends downwardly between the closed extensions $a^2$ and $b^2$ to space the latter apart, additionally serving to engage the angular extensions $a'$ and $b'$ to space them apart.

A metallic strip $d$ lies over the moulding $c$ and bolts $e$, passing through the strip $d$ and metallic wall of the closed portions $a^2$ and $b^2$, engage the lower portions thereof to place the moulding under compression. The moulding is preferably formed of rubber and, as will be readily seen, is mounted to enable the compression set up therein to be changed.

It will be seen that the panels $a$ and $b$ are effectively secured together against separation, at the same time being spaced in a manner such that no metal to metal contact exists, the connection at the same time affording a degree of movement therebetween to accommodate weaving of the vehicle body. The connection effectively eliminates all squeaks and drumming of the body and materially reduces the cost of construction by reason of its ability to be turned out by simple stamping operations. Although the invention has been described in connection with the accompanying drawings, it is not to be limited, save as defined in the appended claims.

I claim as my invention:

1. A connection of the character described comprising a panel, an adjacent panel to be connected thereto, flanges formed on the panels, extensions on the flanges forming reentrant angles with respect to the flanges, said extensions being turned back at the ends to be substantially closed, non-metallic yielding moulding spacing the panels, a cover strip for the moulding, and means to secure the strip to the extensions.

2. A connection of the character described comprising a panel, an adjacent panel to be connected thereto, flanges formed on the panels, extensions on the flanges forming reentrant angles with respect to the flanges and panels, said extensions being turned back at the ends to be substantially closed, non-metallic yielding moulding spacing the panels, a cover strip for the moulding, and means to secure the strip to the extensions.

3. A connection of the character described comprising a panel, an adjacent panel to be connected thereto, flanges formed on the panels, extensions on the flanges forming reentrant angles with respect to the flanges and panels, said extensions being turned back at the ends to be substantially closed, non-metallic yielding moulding spacing the panels enclosing the extensions, a cover strip for the moulding, and means to secure the strip to the extensions.

4. A connection of the character described comprising a panel, an adjacent panel to be connected thereto, flanges on the panels, extensions on the flanges forming reentrant angles with respect to the flanges and panels, said extensions being turned back at the ends to be substantially closed, non-metallic yielding moulding spacing the panels enclosing the extensions, a cover strip for the moulding, and means passing through the moulding to secure the strip to the extensions.

5. A connection of the character described comprising a panel, an adjacent panel to be connected thereto, flanges on the panels, extensions on the flanges forming reentrant angles with respect to the flanges and panels, said extensions being turned back at the ends to be substantially closed, non-metallic yielding moulding spacing the panels enclosing the extensions, a cover strip for the moulding, and means passing through the moulding and extensions to secure the latter to the strip.

6. A connection of the character described comprising a panel, an adjacent panel to be connected thereto, flanges formed on the panels, extensions on the flanges forming reentrant angles with respect to the flanges and panels, said extensions being turned back at the ends to form closed polygons, non-metallic yielding moulding spacing the panels enclosing the extensions, a cover strip for the moulding, and means passing through the moulding and extensions to secure the latter to the strip.

This specification signed this 27th day of August, A. D. 1928.

ALFRED F. MASURY.